United States Patent
Robertson et al.

(10) Patent No.: US 9,457,466 B2
(45) Date of Patent: Oct. 4, 2016

(54) PNEUMATICALLY ACTUATED AND SAFELY COMPLIANT SKELETAL JOINTS FOR ROBOTIC CHARACTERS

(71) Applicant: DISNEY ENTERPRISES, INC., Burbank, CA (US)

(72) Inventors: James R. Robertson, Los Angeles, CA (US); Philip J. Jackson, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 252 days.

(21) Appl. No.: 14/460,725

(22) Filed: Aug. 15, 2014

(65) Prior Publication Data
US 2016/0046018 A1   Feb. 18, 2016

(51) Int. Cl.
| | |
|---|---|
| B25J 9/14 | (2006.01) |
| B25J 11/00 | (2006.01) |
| B25J 17/00 | (2006.01) |
| B25J 17/02 | (2006.01) |
| B25J 19/00 | (2006.01) |
| B25J 19/06 | (2006.01) |

(52) U.S. Cl.
CPC ............... *B25J 9/142* (2013.01); *B25J 17/00* (2013.01); *B25J 17/0233* (2013.01); *B25J 19/0091* (2013.01); *B25J 19/063* (2013.01); *B25J 19/068* (2013.01)

(58) Field of Classification Search
CPC .................................. B25J 9/142; B25J 17/00
See application file for complete search history.

(56) References Cited

U.S. PATENT DOCUMENTS

| | | | | |
|---|---|---|---|---|
| 4,557,623 A | * | 12/1985 | Tella | ........................ B25J 9/146 403/31 |
| 4,784,042 A | | 11/1988 | Paynter | |
| 4,932,806 A | | 6/1990 | Eklund et al. | |
| 5,040,626 A | * | 8/1991 | Paynter | ................... B23Q 1/34 180/8.1 |

(Continued)

FOREIGN PATENT DOCUMENTS

| | | |
|---|---|---|
| CN | 101239468 | 8/2008 |
| CN | 102764188 | 11/2012 |

(Continued)

OTHER PUBLICATIONS

DeGreef, et al, "Towards Flexible Medical Instruments; Review of Flexible Fluidic Actuators," Precision Engineering, Elsevier, Amsterdam, NL, vol. 33, No. 4, Oct. 1, 2009, pp. 311-321.

(Continued)

*Primary Examiner* — Terence Boes
(74) *Attorney, Agent, or Firm* — Marsh Fischmann & Breyfogle LLP; Kent A. Lembke

(57) ABSTRACT

A robot that includes two or more skeletal or rigid links interconnected by a joint. The joint is pneumatically actuated and includes a pneumatic joint actuator that allows the robot's skeletal links to be moved in an expressive manner. The pneumatic actuator includes a pair of opposing air bladders encased within a housing or body of the joint. Each air bladder is positioned on an opposite side of an actuating lever arm, which is rigidly attached to one of the skeletal links and is pivotally mounted on the joint body or housing. Movement of the actuating lever arm causes the attached skeletal link to pivot. To obtain this selective movement, one of the two air bladders is filled with a gas, such as air, while the other is left un-inflated or less inflated, and this forces the lever arm and attached skeletal link to pivot about their mounting point.

18 Claims, 8 Drawing Sheets

(56) References Cited

U.S. PATENT DOCUMENTS

| | | | |
|---|---|---|---|
| 5,245,885 A | 9/1993 | Robertson | |
| 6,062,534 A | 5/2000 | Eggleston | |
| 6,312,398 B1 | 11/2001 | Cencer | |
| 6,684,754 B2 | 2/2004 | Comer | |
| 6,732,015 B2 | 5/2004 | Maeda | |
| 2003/0018388 A1* | 1/2003 | Comer | A61F 2/54 623/14.13 |
| 2007/0021031 A1 | 1/2007 | Madhani et al. | |
| 2013/0152724 A1 | 6/2013 | Mozeika et al. | |
| 2013/0233116 A1 | 9/2013 | Rose et al. | |
| 2016/0059410 A1* | 3/2016 | Staab | B25J 9/146 74/490.05 |

FOREIGN PATENT DOCUMENTS

| | | |
|---|---|---|
| CN | 103213138 | 7/2013 |
| FR | 1531817 A | 7/1968 |
| FR | 2560102 A1 | 8/1985 |
| GB | 1286821 | 8/1972 |
| SU | 1117203 A2 | 10/1984 |
| WO | 2013110086 | 7/2013 |

OTHER PUBLICATIONS

EP Search Report for Application No. 15174171.7, dated May 11, 2016.

Boblan, et al, "A Compliant Lightweight Universal Joint Cascadable to a Multi-Joint Kinematics," 2013, http://www.biorobotiklabor.de/pdfs/boblan-2013-AMAM2013.

Granosik, G., "The OmniTread Serpentine Robot with Pneumatic Joint Actuation," Jun. 2005, Inst. of Autom. Control, Tech. Univ. of Lodz, Poland, http://ieeexplore.ieee.org/xpl/articleDetails.jsp?reload=true&arnumber=1554388.

Vikash Kumar, "Fast, strong and compliant pneumatic actuation for dexterous tendon-driven hands," http://homes.cs.washington.edu/~todorov/papers/KumarICRA13.pdf.

* cited by examiner

PNEUMATICALLY ACTUATED AND SAFELY COMPLIANT SKELETAL JOINTS FOR ROBOTIC CHARACTERS

BACKGROUND

1. Field of the Description

The present description relates, in general, to robots such as robotic characters for use in the entertainment industry and such as robots for interacting safely with humans in other applications. More particularly, the present description relates to techniques for actuating joints, such as rotational joints, in robots in an effective (e.g., responsive and rapid movements) and safe manner.

2. Relevant Background

With the development of new engineering techniques, miniaturization of electronics, and the increase of computing power, designers are now able to design robots or robotic devices that can perform many intricate tasks including cooperative or interactive tasks with humans. While many have predicted a much more rapid expansion of the use of robots in industry, at home, and in entertainment applications, safety implications have created barriers that designers must address and overcome as most robots have the potential to cause damage to their surroundings including humans that may be nearby.

As one example, a biped humanoid robot is a robot with an appearance based on that of the human body. Humanoid robots have been designed for providing interaction with various environments such as tools and machines that were made for humans and often are adapted for safely and effectively interacting with human beings. In general, humanoid robots have a torso with a head, two arms, and two legs each with some form of foot such that the robot can walk on planar surfaces, climb steps, and so on. Humanoid robots may be formed with many rigid links or skeletal components that are interconnected by joints (such as rotational joints) that are operated or positioned through electronic controls of drive motors that apply a force or torque to each joint to move and position a robot.

In order to interact with human environments, humanoid robots require safe and compliant control of the force-controlled joints. In this regard, a controller is provided for each robot that has to be programmed to determine desired motions and output forces (contact forces) and, in response, to output joint torques to effectively control movement and positioning of the humanoid robot. However, it has often proven difficult to achieve desired results with force-controlled robots because while performing a task in a complex environment the robot may encounter uneven ground or even steps, static and dynamic obstacles, and even humans.

A number of useful techniques have been developed for controlling humanoid robots, but, regardless of the specific control techniques implemented by the robot controller, particular data that may be provided by sensors or be calculated has to be accurate for adequate control to be achieved. As one particular example with regard to kinematic parameters, a robot may include a sensor at each joint that is used to provide input to the controller for identifying or determining joint angles, and these joint angles are kinematic parameters used to further control and/or position the robot through movement of its joints.

These and other examples of robots and robotic applications shows show that robots are often designed to perform specific tasks involving speed and precision. Typically, these robots utilize high performance and/or powerful hydraulic or electric motors to actuate or move the skeletal limbs or rigid links by, for example, moving a joint between two of these limbs or links. In order to make these robots safe around humans, their speed and power are mitigated by the use of sensors and complex control hardware and software. Neither the hydraulic actuator nor the electric motor-based actuator is inherently compliant such that robots with these actuators must rely, therefore, on the control system to make them safe (e.g., compliant when in contact with their surroundings if needed such as when in contact with a human). As a result of these and other design requirements, many of these robots are complex and expensive to design, build, and maintain.

In many settings, robots may have differing design criteria that would not require as precise of movement or may require less force to achieve desired functions. For example, robotic characters in theme park attractions or in many human-interactive settings are not required to perform tasks that include high-precision movements. Instead, these robots or robotic characters simply may need to be expressive or to move in a "life-like" and repeatable manner. In other words, these robots may just need to act such as to wave their hand, move their fingers, turn their heads, and so on, but these actions need to be done in a manner that is deemed safe around humans. Presently, these characters have been implemented using hydraulic or electric actuators that, as discussed above, require complex control systems to operate safely.

Hence, there remains a need for improved methods and devices for allowing a robot to be moved or actuated in a less complex manner but while still meeting or exceeding all safety demands for use with or nearby humans.

SUMMARY

The present invention addresses the above problems by providing a robot or robotic system that includes two or more skeletal or rigid links interconnected by a joint. Significantly, the joint is designed to be pneumatically actuated as it includes a pneumatic joint actuator that allows the robot's skeletal links to be moved in an expressive manner. The pneumatic actuator includes a pair of opposing air bladders (or resilient and gas-tight bladders) encased within a housing or body of the joint. Each air bladder (a first bladder and a second bladder) is positioned on opposite sides of an actuating lever arm, which is rigidly attached to one of the skeletal links and is pivotally mounted on or within the joint body/housing. In this way, movement of the actuating lever arm causes the attached skeletal link to pivot.

To obtain this selective movement, one of the two air bladders is filled with additional amounts of a gas, such as air, while the other is left un-inflated or, more typically, is less inflated (under a lower pressure after the addition of gases to the other bladder as the two bladders may initially be filled to equal pressures). This forces the lever arm and attached skeletal link to pivot about their mounting point (e.g., a pin extending from the joint housing/body). More accurately, the bladders are pressurized to first and second pressures (P1 and P2 for the first and second air bladders), and movement or positioning of the lever arm and connected link is controlled by making one pressure greater than the other. The greater the pressure differential the greater the amount of rotation or joint actuation, and the quicker the change in pressures the quicker the movement of the lever arm and link about the rotation axis extending through the mounting pin or pivotal mounting element.

Safety is assured or enhanced with this joint actuator in part because the air bladders are formed of a flexible material (e.g., a rubber, a softer plastic, a fabric sheet, or the like that is can contain a gas) that causes the joint and attached links or skeletal structural elements to be naturally compliant. For example, an external force can be applied to the skeletal link that is being positioned by the pneumatic joint actuator, and the external force can cause the skeletal link to stop its rotation/movement or cause it to move to another position. This is achieved, in some cases, by limiting the amount of pressure applied to each bladder to actuate the joint so that the two bladders are compressible under a relatively low external force on the skeletal link or structural element attached to the actuating lever arm. In other cases, a relief valve may be provided in one of the gas supply lines to allow the joint to be compliant once a certain external force is applied that forces some air out of one or both bladders.

The robot or robotic system includes a joint control assembly that is used to selectively supply controlling gas (e.g., air) to each of the bladders to actuate the joint. Controlling gas flow (or air flow) may be directed through tubes running within one of the two skeletal links or structural elements. In another embodiment, a pair of flow channels is provided within the body of the skeletal link or structural element itself so that there is no need for tubing to be run in the robot, and one of the air bladders is fluidically connected at one end of each of the flow channels to receive controlling gas flow (e.g., to gas outlets of the flow channels).

The joint control assembly also includes first and second gas sources that can be selectively operated to provide the pressurized control gas to the first and second air bladder with the gas source connected to the second end of the flow channels (or supply lines/tubes if used), and a controller is included that transmits control signals to the two gas sources to achieve desired joint actuation or robotic movements. The joint control assembly may include a feedback pressure sensor or gauge on or within each flow channel to measure the pressures in the two flow channels. This measured or sensed gas pressure is used, in some embodiments, as an indicator of the amount of fill of each bladder (volume of gas in the bladder) that, in turn, may be calibrated to an amount of rotation of the actuating lever arm and its attached skeletal link. In operation, the controller may process the signals from the feedback pressure sensors to determine whether or not to provide additional control gas flow to either of the two bladders to provide a desired movement of the skeletal link (e.g., to actuate the joint by changing P1, P2, or both bladder pressures concurrently or sequentially to provide desired amounts of inflation or first and second volumes, V1 and V2, in the first and second bladders).

More particularly, a robotic joint assembly is provided that is designed to provide expressive movement but yet also to be compliant to enhance its safe use in locations where human interaction is allowed or likely. The assembly includes a first skeletal link with a body extending from a first end to a second end, and the assembly also includes a rotational joint, mounted to the second end of the first skeletal link, which includes a joint housing (or body) with sidewalls defining an interior space and with a pivotal mounting element (e.g., a pin or post, a rotational coupling, or the like) that is supported in or on the joint housing. The assembly further includes a second skeletal link with a body extending from a first end to a second end, and the first end of the body is pivotally coupled to the pivotal mounting element of the joint housing. Significantly, the assembly includes a pneumatic joint actuator with first and second gas bladders positioned within the interior space of the joint housing, and the second skeletal link is pivoted with inflation of at least one of the first and second gas bladders (e.g., inflate one bladder while leaving the other bladder uninflated or less inflated).

In some cases, the assembly also includes an actuating lever arm extending outward from the first end of the body of the second skeletal link into the interior space so as to be disposed or positioned between the first and second gas bladders. As a result of this arrangement, movement of the actuating lever arm urges the first end of the body of the second skeletal link to pivot about the pivotal mounting element. Particularly, the selective inflation of the first gas bladder causes the first gas bladder to apply a first actuation force on a first side of the actuating lever arm and inflation of the second gas bladder causes the second gas bladder to apply a second actuation force on a second side opposite the first side, i.e., the first and second actuation forces are opposing forces urging the lever arm to move and the connected second skeletal link to rotate or pivot.

The joint housing may include encasement barriers in the interior space that are configured to define, with the sidewalls or interior surfaces of the housing, first and second encasements in which the first and second gas bladders are placed (e.g., fixed volume spaces in the joint housing). In such cases, the actuating lever arm extends between first and second encasements such that the bladders have to move toward each other through the lever arm when their volumes are increased (i.e., inflated with a pressurized gas such as compressed air or the like). The first and second gas bladders may take the form of an inflatable bag formed from a flexible and compliant material such as a rubber, plastic, or fabric, which allows it to be expanded in volume when inflated but also to readily be compressed to a smaller volume (e.g., when an external force is applied to the second skeletal link it is relatively free to pivot in either direction even with one or both bladders inflated or under pressure).

In some implementations of the assembly, the first skeletal link includes a first flow conduit extending through the body of the first skeletal link that is coupled at one end to an inlet to the first gas bladder, and the first skeletal link includes a second flow conduit extending through the body of the first skeletal link that is coupled at one end to an inlet to the second gas bladder. In this way, the flow channels or conduits of gas used to inflate the gas bladders are provided through passageways in the structural components of the robot itself rather than through additional tubing, and this allows the conduits or channels to be formed integrally with the body of a skeletal link.

The assembly may also include a first control gas supply fluidically linked to the first flow conduit and a second control gas supply fluidically linked to the second flow conduit. Then, the first and second control gas supplies can be independently operable to provide a pressurized gas to the first and second flow conduits to perform the selective inflation of the first and second gas bladders. Further, the assembly may include a joint controller providing control signals to the first and second control gas supplies to perform the selective inflation to move the second skeletal link through a predefined motion profile. In such embodiments, first and second pressure sensors can be provided for sensing pressures in the first and second flow conduits and, in response, providing pressure feedback signals to the joint controller. The joint controller may then process the pressure feedback signals and generate the control signals based on the pressure feedback signal processing.

In some particular implementations, the assembly may also include an additional joint housing pivotally attached to the second end of the body of the second skeletal link. This assembly can include a third gas bladder filled with a fixed volume of a gas. Typically, in the assembly, the third gas bladder extends through or on the body of the second skeletal link with a first end positioned in the interior space of the joint housing and abutting one or more exterior surfaces of the first end of the second skeletal link and with a second end positioned in an interior space of the additional joint housing. The assembly then may further include an additional actuating lever arm extending outward from the second end of the second skeletal link into the interior space of the additional joint housing.

During operation, the first end of the third gas bladder is compressed during pivoting of the second skeletal link on the pivotal mounting element, and, in response, the second end of the third gas bladder is expanded causing the second end of the third gas bladder to apply an additional actuating force, whereby the additional joint housing pivots on the second end of the body of the second skeletal link. In any of these embodiments, the second skeletal link may be pivoted about a longitudinal axis of the body of the second skeletal link with the inflation of at least one of the first and second gas bladders while other implementations may call for the link to rotate about an axis passing through the pivotal mounting element.

DETAILED DESCRIPTION OF THE PREFERRED EMBODIMENTS

Briefly, robotic joints are described that are naturally compliant to enhance safety and are relatively simple to manufacture, maintain, and operate. Each robotic joint includes a pair of opposing gas bladders (e.g., air bladders) within the joint body or housing. The joint housing may be mounted onto a first skeletal link or structural element, and a second skeletal link may be pivotally coupled to the first skeletal link such as at or within the joint housing.

Further, an actuating lever arm is included that extends from or is connected to the second skeletal link (e.g., a cantilevered member extending out from the end of the second skeletal link on a side opposite to the pivotal mounting pin or element), and the actuating lever arm is positioned between the two gas bladders. Actuation of the joint is provided by selectively supplying a gas such as air to one or both of the gas bladders to apply equal or differing actuation forces to opposite sides of the actuating lever arm. For example, one bladder may be fully inflated with a controlling or actuating gas flow selectively provided by a controller from a pair of pressurized gas sources or supplies, and this applies a much greater force upon one side of the actuating lever arm, which causes the lever arm to move within the joint housing and the interconnected second skeletal link to rotate about the pivotal mounting pin or element.

The controlling or actuating gas flow may be provided through flow channels in the body of the first skeletal link or structural element, with a connector or connection fitting provided at each end of the flow channels (e.g., to avoid running tubing within the robotic links). The gas bladders may be formed of a soft and flexible material such as a rubber, a plastic, or a fabric that can contain a gas. Hence, the pneumatic joint actuator can be compliant to applied external forces to enhance safe operations of a robot with such a pneumatic joint actuator as the flexible material can readily be deformed and the bladders compressed. Gas relief valves may be provided in the gas supply lines to allow such compression by allowing an externally applied force to push gas out of the bladders (e.g., to maintain gas pressures in the bladders below a predefined maximum value).

Figure 1:
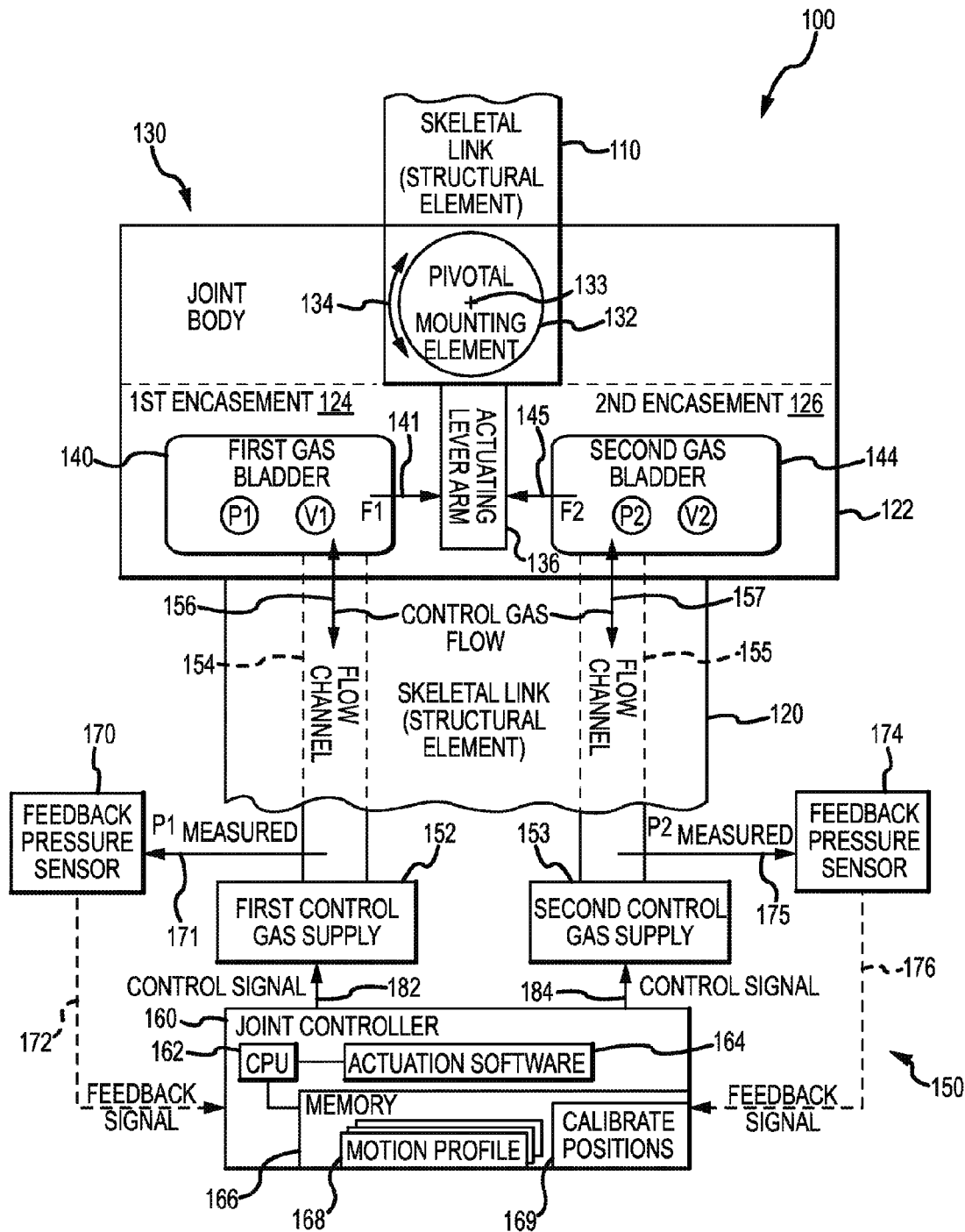
FIG. 1 is a functional block diagram of a portion of a robot or robotic system including a joint with a pneumatic joint actuator of the present description along with an actuation control assembly that provides control gas flow via conduits or flow channels in one of the joined links or structural elements of the robot.

FIG. 1 illustrates a functional block diagram of a portion of a robot or robotic system 100 with a pneumatically actuated joint 130 (or a joint with a pneumatic joint actuator). The robot or robotic system 100 includes a first skeletal link (or structural element) 120 that is coupled with a second skeletal link (or structural element) 110 via the pneumatically actuated joint 130. To this end, the joint 130 includes a joint body 122 affixed to an end of the first skeletal link 120 (or to an end of the linear or other-shaped body of the link 120). The joint 130 includes a pivotal mounting element 132 such as a pin or post extending output from a surface of the joint body 122, and, at one end, the second skeletal link 110 is pivotally coupled to the pivotal mounting element 132 to allow it to rotate or pivot as shown with arrow 134 about a pivot axis 133 extending through the pivotal mounting element 132. In this way, the joint 130 is designed to pivotally couple the two skeletal links 110, 120. As shown, the mounting element 132 is a circular shaped post or pin and the end of the skeletal link 110 or its body includes a circular-shaped passageway or bore for receiving the element 132, but this arrangement may be reversed or another pivotal mounting arrangement may be used to allow the skeletal link to pivot 134 about the axis 133 on joint body 122.

To provide pneumatic actuation or a pneumatic actuator, the joint 130 includes first and second gas bladders 140, 144, and the bladders 140, 144 are contained within the joint body 122 such as within an interior space defined by sidewalls of the joint body 122. The gas bladders 140, 144 are formed of a flexible material such as a rubber, and each bladder 140, 144 has an at-rest or uninflated size that allows it to be inserted into first and second encasements 124, 126 within the joint body 122. The encasements 124, 126 may be defined by sidewalls or interior surfaces of the joint body 122. When the bladders 140, 144 are filled with gas, they expand first to fill the space or volume of the encasements 124, 126. Secondly, though, an opening is provided between the two encasements 124, 126, and the bladders 140, 144 will then expand or extend into the volume or space of the adjacent or neighboring encasement 124, 126.

The pneumatic joint actuator may be thought of as including the two gas bladders 140, 144 and the encasements 124, 126 of the joint body 122 as well as the pivotal mounting element 132. Further, the actuator may be thought of as including an actuating lever arm 136 that extends from and is rigidly attached to the second skeletal link 110 (e.g., from the end of the link's body that is also coupled to the pivotal mounting element 132). The actuation lever arm 136 is positioned in the joint body 122 to extend between the two spaces or interior volumes of the bladder encasements 124, 126.

As a result of this positioning, the first bladder 140 applies a first force, F1, as shown with line 141 upon a first side of the lever arm 136 while the second bladder 144 concurrently applies a second force, F2, as shown with line 145 upon a second side of the lever arm 136, which is opposite the first side of the lever arm 136. Hence, the two bladder-provided forces, F1 and F2, are opposing actuation forces urging the lever arm 136 to move in different directions within the joint body 122 and to cause the interconnected skeletal link 110 to rotate 134 in different directions.

When the two forces, F1 and F2, are equal, the lever arm 136 and link 110 may be at a first or central position, and, when the forces F1 and F2 differ from each other, rotation 134 will occur about axis 133. Each bladder 140, 144 will have a volume, V1 and V2, and an internal or gas pressure, P1 and P2, during operation of the robotic system 100, and these parameters can be varied to achieve a desired actuation of the joint 130 including rotation 134 of the skeletal link 110 in either a clockwise or counterclockwise direction about axis 133 or selective positioning of the link 110 at a particular location or angular offset.

The robotic assembly 100 further includes a joint control assembly 150 to set and change the pressures, P1 and P2, and the volumes, V1 and V2, of the bladders 140, 144 of the pneumatic joint actuator of joint 130 to control movement 134 of the link 110 relative to its connection to the link 120. The control assembly 150 includes a joint controller 160 that includes a processor or CPU 162 that operates to manage the memory 166 (e.g., store and retrieve data in digital form) and to run one or more control programs (in non-transitory computer readable medium).

For example, the processor 162 runs actuator software module(s) 164 to control operations of the robotic joint 130 (or its pneumatic joint actuator) including outputting control signals 182, 184. The control signals 182, 184 are used to selectively operate a first control gas supply 152 and a second control gas supply 153. The control signals 182, 184 may be provided by a motion profile 168 retrieved from memory 166 (e.g., a listing of differing pressures, P1 and P2, to be provided for predefined time periods to achieve a desired motion 134 of the link 110 about the pivotal mounting element 132 in joint body 130). The positions achieved by differing pressures P1 and P2 in bladders 140, 144 may be defined as calibrated positions 169, which may be defined by test runs of the system 100 in which different pressures, P1 and P2, are applied and achieved movements 134 or positions of the link 110 are documented (e.g., mapping of joint or link positions to bladder pressures such as with a visual sensing system). Such calibration data 169 may be used to manually provide movements of the link 110 by an operator of the joint controller and/or may be used to generate the motion profiles 168 and their pressure values.

The control assembly 150 uses the first control gas supply 152 to provide gas (e.g., air) flow 156 through a flow channel 154 in or on the link 120 to the first gas bladder 140 to set the bladder pressure, P1, and to modify the bladder volume, V1. Similarly, the control assembly uses the second control gas supply 153 to provide gas flow 157 through a flow channel 155 to the second gas bladder 144 to set the bladder pressure, P1, and to adjust the bladder volume, V2. The flow channels 154, 155 may be tubes in or on a body of the link or structural element 120. In other cases, though, the channels 154, 155 are provided as integral conduits or passageways formed in the body of the link 120, e.g., the body of the link 120 may be formed such as with 3D printing, molding, machining, or the like to include the flow channels 154, 155 extending between two ends of the link's body. Connectors or connection elements are provided at opposite ends of the channels 154, 155 to allow fluidic or leak-tight connection with the bladders 140, 144 and with outlet tubing or components of the pressurized gas supplies 152, 153.

The control assembly 150 is shown to include a pair of feedback pressure sensors 170, 174 that are linked to the flow channels 154, 155 to obtain measurements as shown at 171, 175 of the bladder pressures, P1 and P2. The pressure sensors 170, 174 are communicatively linked (wired or wireless) to the joint controller 160 to provide feedback signals 172, 176, which can be processed by the controller 160 or its software 164 to determine whether or not to transmit control signals 182, 184 to increase or decrease gas flow 156, 157 to achieve desired bladder pressures, P1 and P2, (as may be defined in motion profiles 168) and associated movements 134 of the skeletal link 110.

Figure 2A:
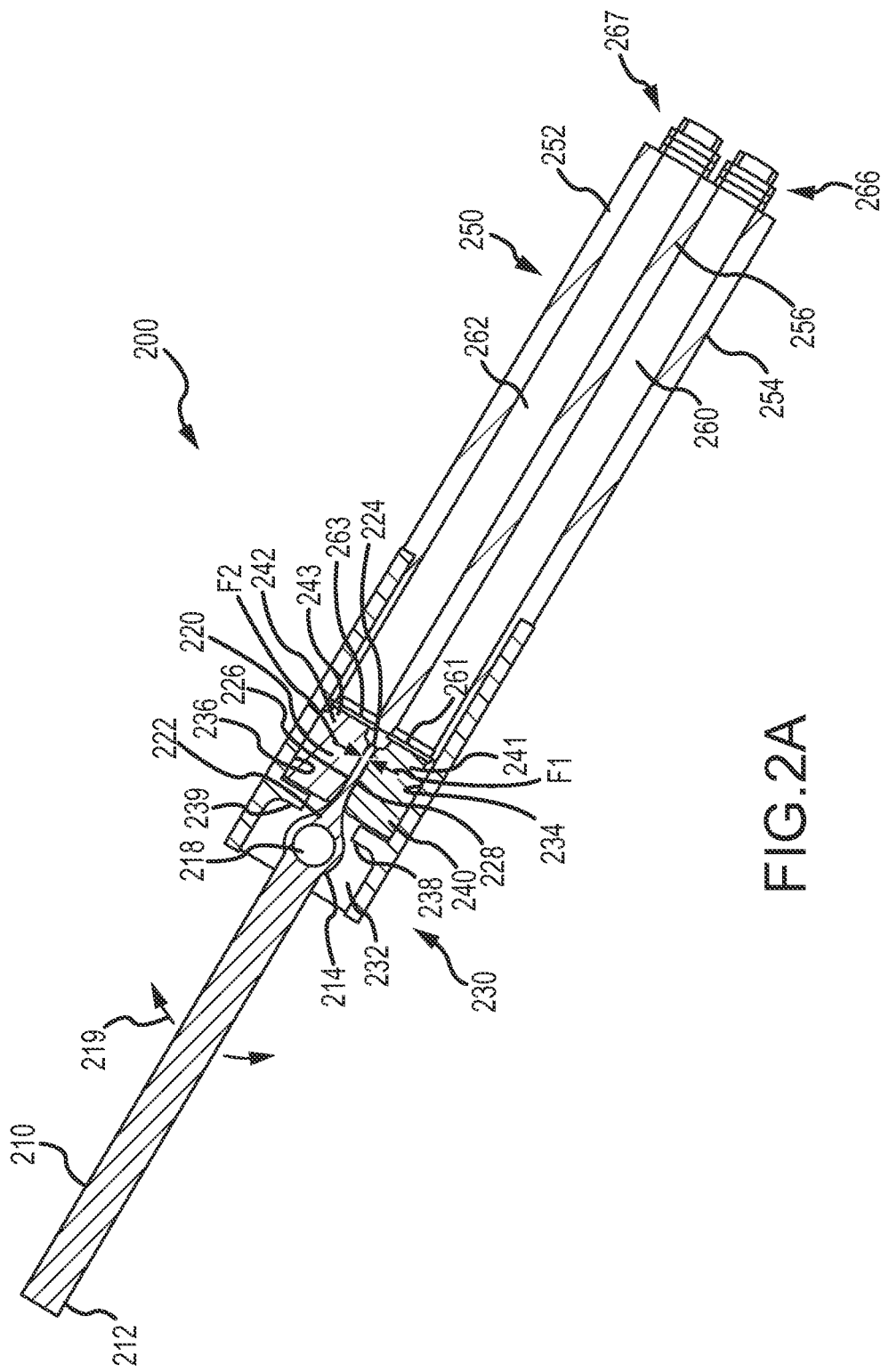
FIGS. 2A and 2B are sectional views of a link assembly of a robot or robotic system (such as that shown in FIG. 1) illustrating use of a rotational joint with a pneumatic joint actuator to rotate or move a robot link (or skeletal link or structural element) with the link assembly shown at first and second operating states.
Figure 2B:
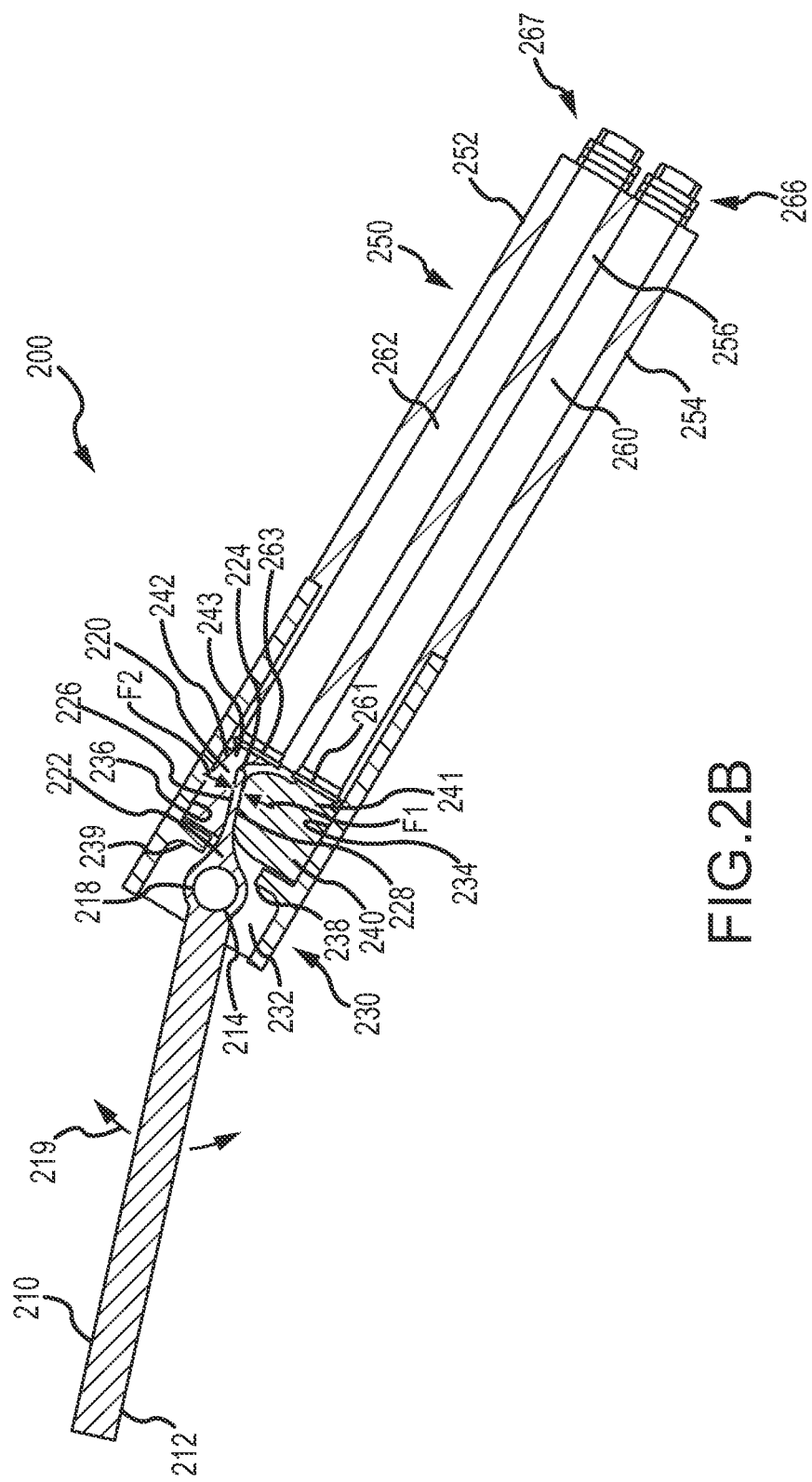

With the pneumatically actuated joint 130 and its operation understood, it may now be useful to provide specific examples of implementations of pneumatic joint actuators that may be used within nearly any robot with two joined links for which expressive and compliant motion is desired. FIGS. 2A and 2B illustrate a robotic joint assembly 200 in two operating states or with its pneumatic actuator in two operating states to move a link 210 to two differing positions. As shown, the assembly 200 includes a link or structural element 210 with a body extending from a first end 212 (outboard or cantilevered end) to a second end 214 (inboard or pivotally coupled end). The assembly 200 further includes a second link or structural element 250 with outer sidewalls 252, 254 upon which is mounted (or, in some cases, integrally provided) a joint body or housing 230.

The link or structural element 210 is pivotally coupled (e.g., the joint provided in assembly 200 is a rotational joint) to the link or structural element 250 within the joint body or housing 230. To this end, the joint body 230 includes a pivotal mounting element 218, such as a post or pin, extending from an interior surface 232 of the joint housing 230, and the link 210 is coupled at end 214 to the mounting element 218 such that it is free to move, as shown with arrows 219, relative to the stationary mounting element 218, e.g., to have mating or bearing surfaces slide relative to each other. Opposite sidewalls of the joint housing 230, e.g., the one providing surface 232 and the one removed to provide the view shown in FIG. 2A, may be used to retain the link end 214 on the post/mounting element 218.

An actuating lever arm 220 is provided in the assembly 200 that extends from the link end 214. The lever arm 220 may be a linear member with a width that matches or is some amount less than the width of an interior bladder-receiving space in the joint housing 230 defined by opposite sidewalls 234, 236 so that the lever arm 220 is spaced apart from the surfaces of the joint housing. The lever arm 220 further may have a length that is 30 to 50 percent or more (e.g., 75 to 90 percent or more) of the depth of this interior bladder-receiving space in the joint housing, and, significantly, the lever arm 220 is positioned to generally divide the interior bladder-receiving space into two equal spaces or volumes in which first and second gas bladders 240, 242 are positioned. Stated differently, the lever arm 220 is positioned so that it extends between the opposing bladders 240, 242 within the joint housing 230.

In this manner, inflation of the bladders 240, 242 with a control gas flow causes the bladders 240, 242 to apply opposing actuation forces, F1 and F2, onto opposite sides 228, 226, respectively, of the lever arm 220. Since the lever arm 220 is rigidly attached (or integrally formed with) the end 214 of the link 210, movement of the lever arm 220 due to application of forces, F1 and F2, causes the link 210 to pivot or rotate 219 about the mounting element 218. The interior space or encasements of the joint housing 230 used to receive the bladders 240, 242 may be defined by the opposite sidewalls 234, 236 and also be end stops 238, 239 extending between the sidewalls 234, 236 proximate to the mounting element 218. The end stops 238, 239 may be used to limit the expansion of the bladders 240, 242 (e.g., to define a maximum volume of the bladders 240, 242 by furthering the encasing of the bladders 240, 242 by sidewalls 234, 236), and the end stops 238, 239 may also be used to limit rotation of the link 210 by limiting rotation or angular movement of the lever arm 220 within the joint housing 230. This limited rotation may be useful to define a range of movement for link 210 such as over a 90 to 120 degree range (e.g., plus or minus 45 to 60 degrees from the position shown in FIG. 2A as measured along a linear axis of the link 210). Such a movement limitation may be seen in FIG. 2B with end stop 239 contacting the lever arm 220 to limit further rotation 219 of the link 210.

The bladders 240, 242 are, as discussed above, formed of a flexible material with a sidewall and an opening 241, 243 (e.g., each bladder 240, 242 is an inflatable bag) to receive a gas that inflates the bladders 240, 242. The bladders 240, 242 may be formed similar to a conventional balloon to be inflated into a spherical shape or be shaped differently such as with a rectangular at rest shape as shown in FIG. 2A. The open ends or inlets 241, 243 of the bladders 240, 242 are fluidically coupled with outlets 261, 263 of flow channels or gas conduits 260, 262 in the structural element or link 260.

The flow channels 260, 262 are defined by outer sidewalls 252, 254 and interior or dividing wall 256. As shown, the flow channels 260, 262 extend the length of the body of the link or structural element 250, with inlets or connectors 266, 267 provided at an end of the link 250 to allow the flow channels 260, 262 to be coupled with supply tubes or lines (not shown) from pressurized gas supplies. In this manner, gas (e.g., air) flow or pneumatic control can be provided to the bladders 240, 242 (or a pneumatic joint actuator) through integral and/or internal airflow channels 260, 262 in a structural component of the robot, e.g., through the body of the skeletal link rather than with additional tubing/lines that can make the robot more complex to manufacture, implement, and/or maintain.

As shown in FIG. 2A, the bladders 240, 242 are inflated to matching volumes (i.e., V1=V2) such as by applying equal pressures (i.e., P1=P2) to each bladder 240, 242 with control gas flow through flow channels 260, 262. Such an operating state of the pneumatically actuated joint of the assembly 200 may be useful for placing the link 210 in a desired positioned such as with link 210 extending straight outward from joint housing 230 or with its longitudinal axis aligned with or parallel to a longitudinal axis of link 250. Changing the pressure of either bladder 240 or 242 will cause there to be a pressure differential (P1<P2 or P1>P2) between the two bladders 240 and 242 (or a differing actuation force, F1 does not equal F2, being applied to sidewalls 226, 228 of the lever arm 220), and this will cause the lever arm 220 and interconnected link 210 to rotate or pivot 219 about pin or mounting element 218.

An exemplary secondary operating state of the assembly 200 is shown in FIG. 2B where the pressure, P1, of the bladder 240 is caused by a controller (not shown) to be greater than the pressure, P2, of the bladder 242. This causes a greater force, F1, to be applied to the arm 220 by the bladder 240 than the force, F2, applied to the arm 220 by the bladder 242, which causes the bladder 240 to expand in volume, V1 (and bladder 242 to shrink in volume, V2). As a result, the lever arm 220 is moved within the housing 230 and the link 210 is pivoted or rotated 219 about the pivotal mounting element 218.

The controller can achieve the state shown in FIG. 2B from the state shown in FIG. 2A by increasing gas flow to the bladder 240 to increase its pressure, P1, while holding the flow and pressure, P2, constant in the bladder 242. Alternatively, the pressure, P2, of the bladder 242 may be reduced while holding the pressure, P1, of the bladder 240 constant or as shown in FIG. 2A, or a combination of these may be used (e.g., inflate bladder 240 while also actively or passively allowing bladder 242 to be deflated). As shown, the bladder 240 expands toward the bladder 242 because it is encased (at least partially) in all other directions such that it can only move toward the other or opposing bladder 242 via the lever arm 220. The bladders 240, 242 are shown to contact substantially all or the full length of the opposite sides 226, 228 of the lever arm 220 (from the end 222 mated with end 214 of link 210 to the tip 224). In other embodiments, though, the bladders 240, 242 may only contact a portion of the lever arm to apply the actuation forces, F1 and F2, such as at a contact point or contact area distal to the pivotal mounting element 218.

Figure 3:
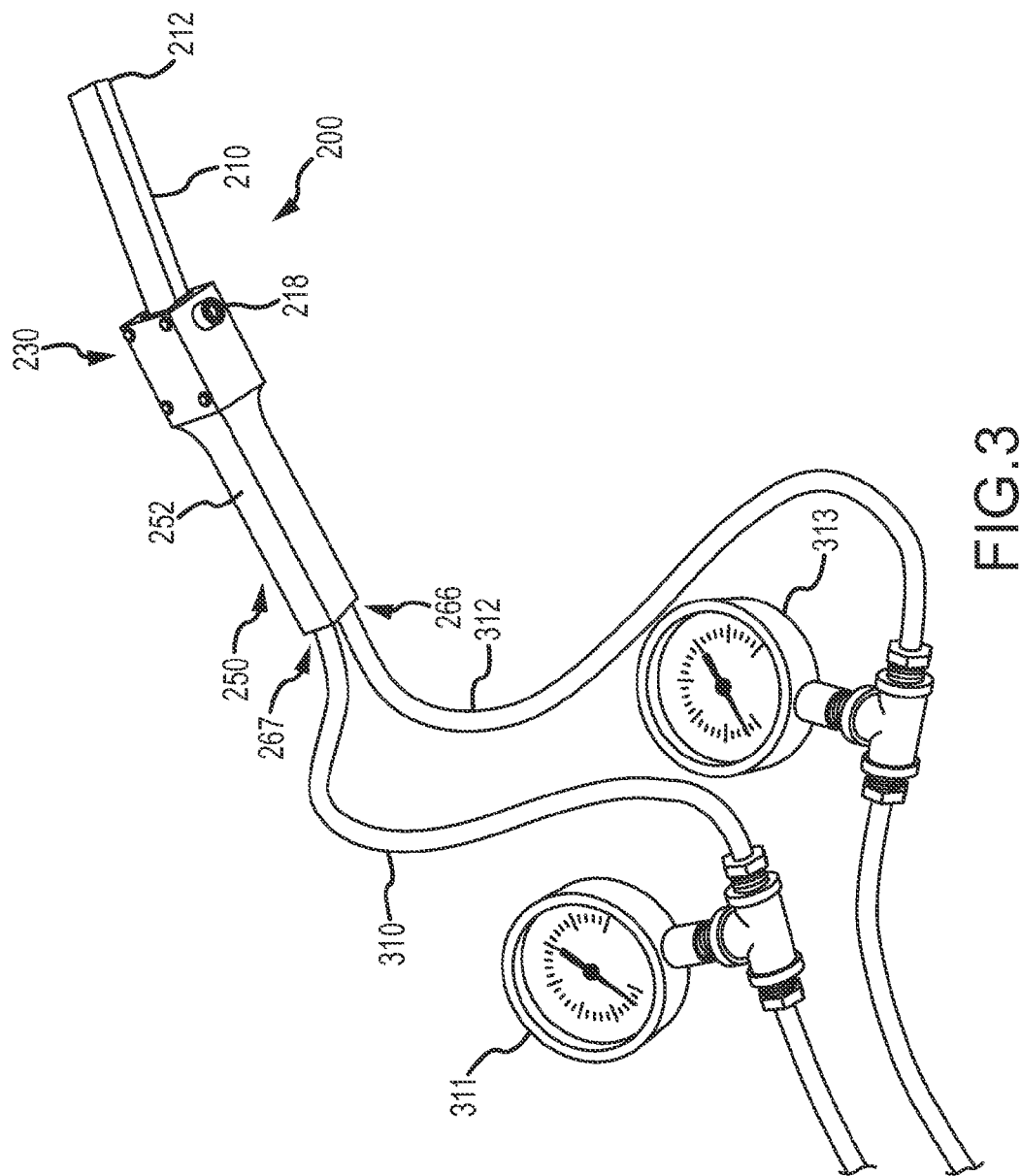
FIG. 3 is a perspective view of a prototype of the link assembly of FIGS. 2A and 2B with gas control supply lines connected to the link assembly to operate the pneumatic joint actuator.
Figure 4:
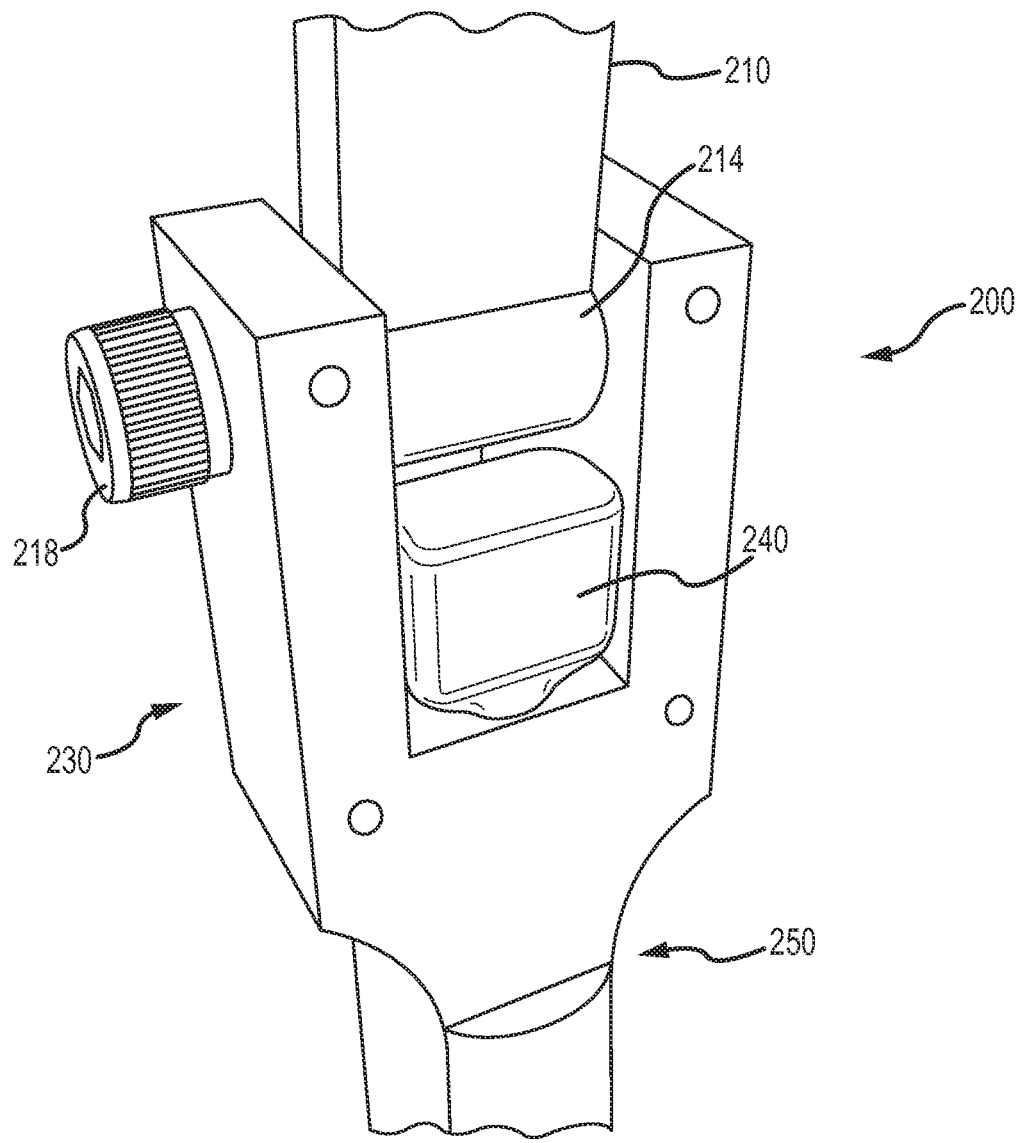
FIG. 4 illustrates the link assembly of FIG. 3 with a cap or sidewall of the joint body or housing removed to expose one of the opposing gas bladders of the pneumatic joint actuator.

FIGS. 3 and 4 illustrate in more detail a prototype of the robotic link assembly 200 with a perspective view and an enlarged view of the pneumatically actuated joint with an outer cover or sidewall of the joint housing 230 removed to expose one of the bladders 240. As shown, the joint assembly 200 can be actuated by selectively providing a control gas flow via a first supply line 310 coupled to connector 267 and a second supply line 312 coupled to connector 266 of the flow channels in link or structural element 250. Pressure gauges or sensors 311, 313 may be included in the supply lines 310, 312 to provide a controller with feedback readings of the pressures in the lines 310, 312 and, in turn, in the opposing bladders encased or contained within joint housing 230. When the pressures measured with gauges 311, 313 are allowed (by a controller) to differ from each other, the link or structural element 210 of the robotic joint assembly 200 will be caused to rotate or pivot about the pivotal mounting element or pin 218, which in this prototype extends through the joint housing 230, as one of the bladders is filled with a greater volume of gas (e.g., expands to a greater volume such that V1 does not equal V2).

FIG. 4 shows that one implementation or prototype of the joint actuator may utilize rectangular-shaped (when at rest or under an actuation pressure matching atmospheric pressure) gas bladders as shown with bladder 240. When uninflated or at rest, the bladder 240 is shown to generally fill the interior space or void within the joint housing 230 (between the link 250 and the link end 214 (which encapsulates and mates pivotally with mounting element/pin 218) and to abut the opposite sidewalls of the joint housing 230. When the housing 230 is reassembled with the removed sidewall attached, the bladder 240 is encased such that it has only one path or direction to expand (or substantially one path as it may expand some amount linearly along the axis of the housing 230 toward the link 210 and/or expand to until all or most of its surfaces abut the inner surfaces of the encasing sidewalls of the joint housing 230) and that is toward the opposing bladder through the actuating lever arm affixed to link end 214.

Figure 5A:
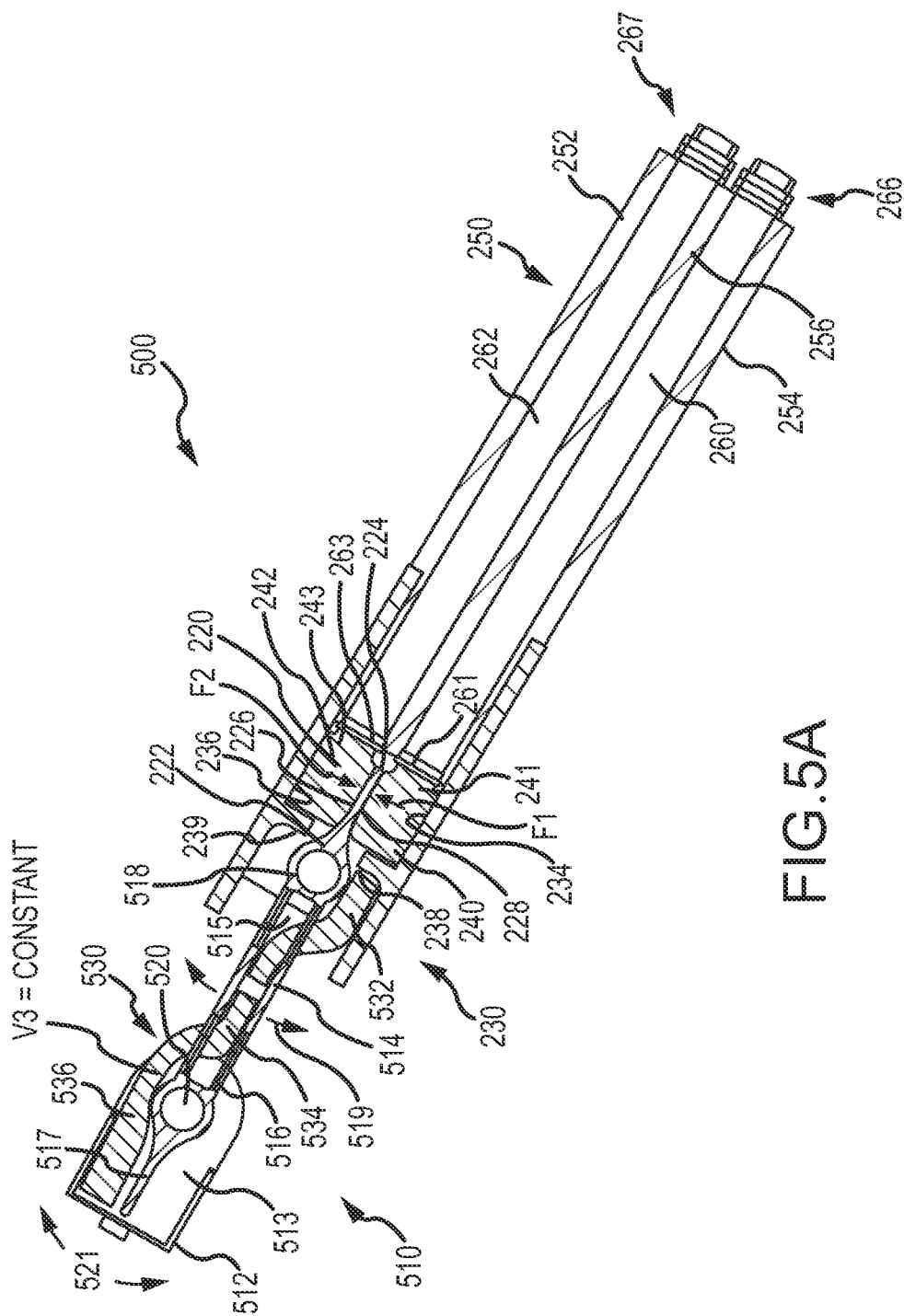
FIGS. 5A and 5B are sectional views similar to those shown in FIGS. 2A and 2B of a robot link assembly with a secondary pneumatically actuated joint in addition to the joint of FIGS. 2A and 2B (e.g., one actuated indirectly by actuation of the first pneumatic joint actuator)
Figure 5B:
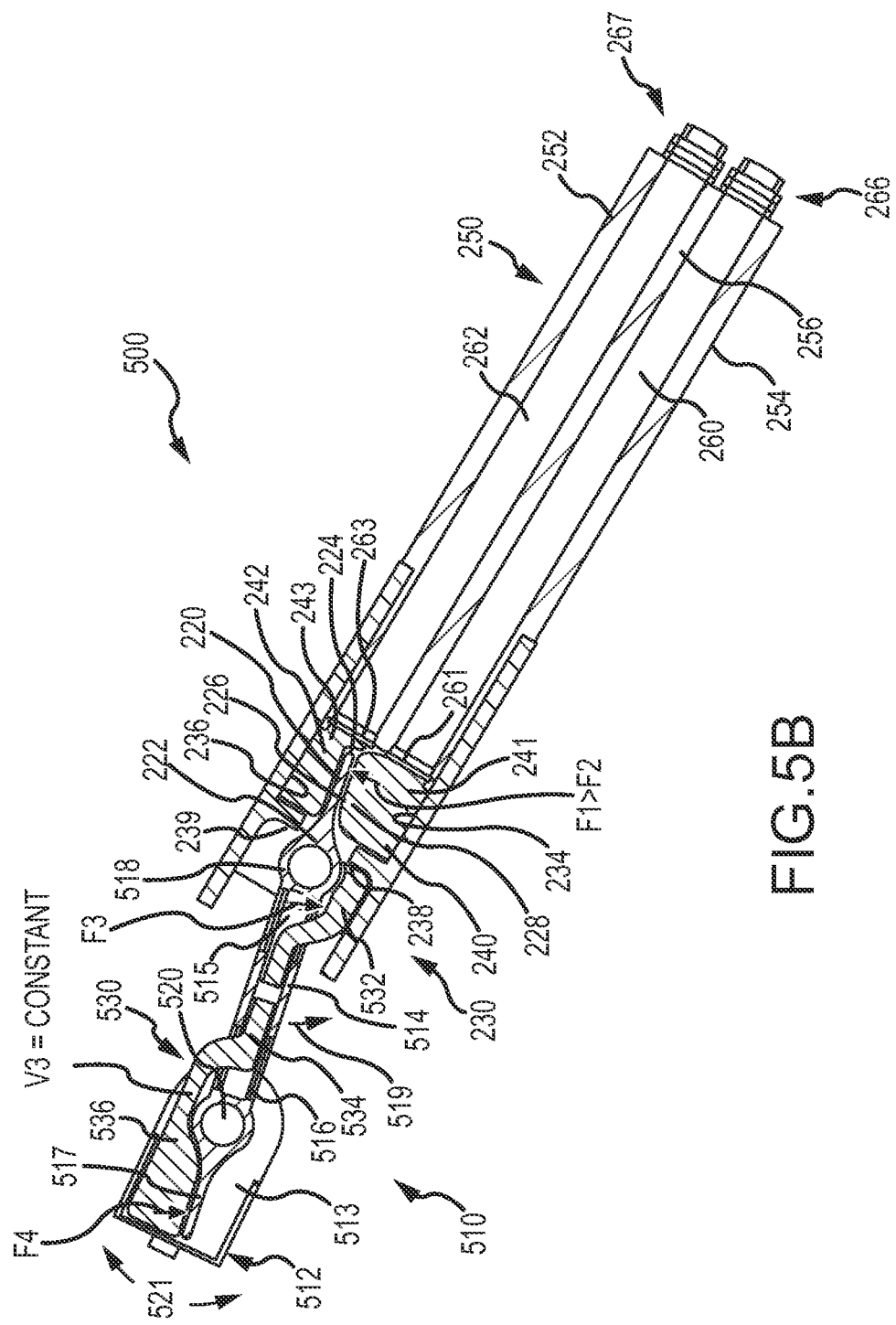

The use of pneumatically actuated joints (or pneumatic actuators in robotic joints) may readily be expanded from use in a joint to provide rotation about a single pivot or rotation axis to provide double or dual joint movements (i.e., movement or pivoting about two pivot or rotation axes that may or may not be parallel to each other). For example, FIGS. 5A and 5B illustrate a dual movement joint assembly 500 of the present description. The assembly 500 includes components shown in the robotic joint assembly 200 of FIGS. 2A and 2B, with repeated components being numbered similarly in both sets of figures. Specifically, the assembly includes the skeletal link 250 with a body having sidewalls 252, 254, 256 defining internal and integral flow conduits or channels 260, 262 to provide control gas flow independently and selectively to a pair of opposing gas bladders 240, 242 in a joint housing 230. The selective inflation or pressurization of the gas bladders 240, 242 is used to apply actuating and opposing forces, F1 and F2, on sides 226, 228 of the actuating lever arm 220 within the joint housing 230.

The skeletal link 210 of assembly 200, however, is replaced in assembly 500 with the skeletal link 510, which includes a linear structural element 514 that is pivotally coupled at a first end 518 to the pivotal mounting member 218 of the joint housing 230. Thus, the linear structural element 514 will be caused to pivot as shown with arrows 519 about the axis of member 218 with movement of the lever arm 220 by opposing bladders 240, 242 similar to link 210 in assembly 200. In contrast, though, the skeletal link 510 has an interior space or void 515 that is used to contain and support a third gas bladder 530.

The third gas bladder 530 has a first end 532 inserted into the void or interior space of the joint housing 230 adjacent and, typically, abutting one or more surfaces of the end 515 of the linear structural element. This positioning is selected such that, as shown in FIG. 5B, when the lever arm 220 is moved in one of the two rotation directions (actuated by one of the two bladders 240, 242 when F1>F2 (or vice versa)) as shown with arrow 519, the link 514 applies a third actuation force, F3, onto the third gas bladder in end 532 as the link 514.

The third gas bladder 530 is an enclosed or sealed bladder or bag without a gas inlet or outlet such that it can be filled with a fixed amount or volume, V3, of a gas (or liquid is some embodiments) 534. Hence, when the end 532 is compressed by actuation force, F3, the gas (or liquid) 534 is forced to moved out of the end 532 into other portions that are caused to expand in FIG. 5B with bladder end 536 expanding to apply a forth actuation force, F4, to provide dual motion or dual actuation within the joint assembly 500.

The assembly 500 includes a second joint housing or body 530 that is attached to the linear structural element 514 at end 516 (opposite the end 518 pivotally coupled to mounting element or member 218). The end 516 is pivotally coupled to the second joint housing 530 within an interior space or void as defined by sidewalls or interior surfaces 513 of the housing 530 via pivotal mounting element or post 520. Actuating lever arm 517 is rigidly affixed to the end 516. Hence, when the end 536 of the bladder 530 is expanded by movement of the contained gas/fluid 534 as shown in FIG. 5B, the bladder end 536 applies an actuation force, F4, against the lever arm 517 and encasing portions of the joint housing 530, which causes the housing 530 to pivot as can be seen in FIG. 5B with end 512 rotating 512 about the pivot axis passing through mounting element or post 520. When the end 536 later shrinks (e.g., when F2 is equal to or greater than F1), the housing 530 will pivot 521 in the opposite direction about the mounting element 520. In this manner, dual actuation or movement is achieved in robotic joint assembly 500 with only one directly controlled or actuated joint (in housing or body 230 with opposing bladders 240, 242 providing a part of the pneumatic joint actuator).

Figure 6:
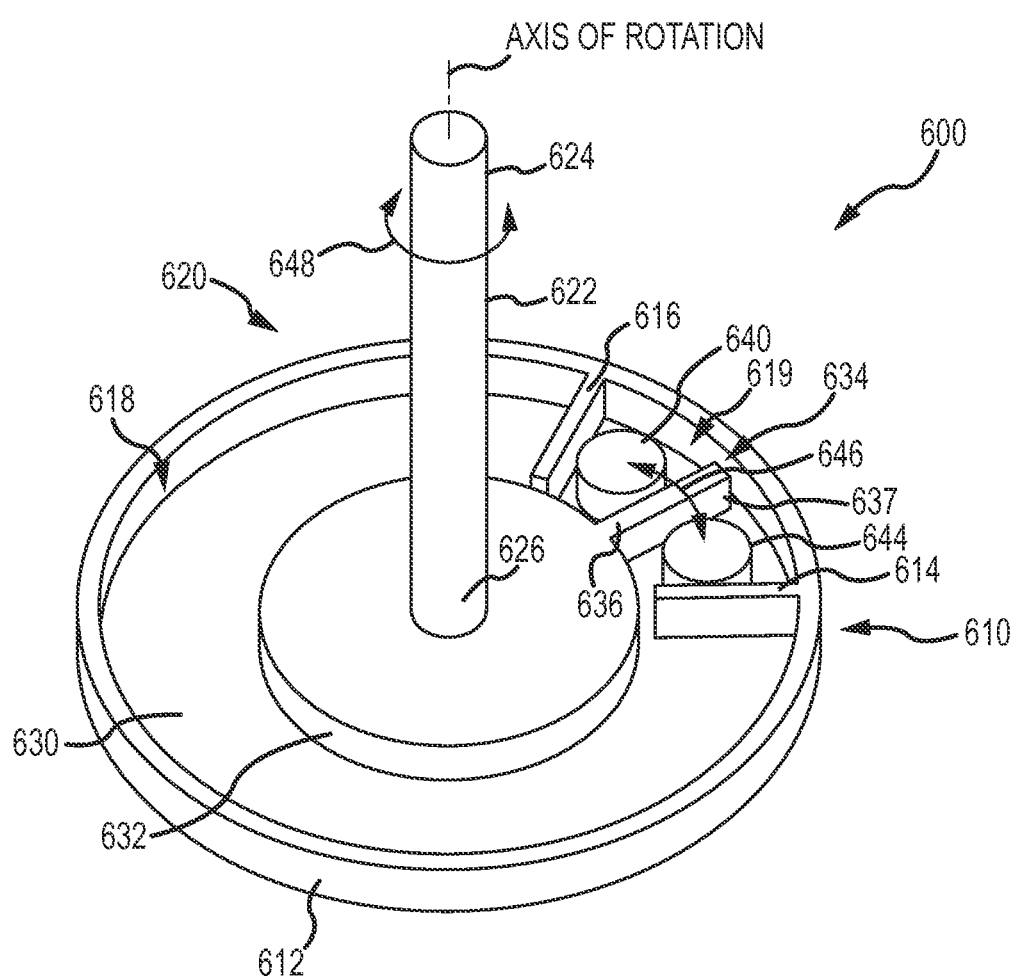
FIG. 6 illustrates a top perspective view of another embodiment of a robotic link assembly with a joint housing sidewall removed to illustrate components of an exemplary implementation of a pneumatic joint actuator of the present description.

Pneumatic joint actuation may be used to rotate a link or structural element about its pivotal mounting point as shown in FIGS. 2A to 5B. In other cases, though, pneumatic actuators for joints may be designed to cause the actuated link to rotate about its longitudinal axis, which may be useful in some robotic system designs. For example, FIG. 6 illustrates another robotic link assembly 600 that may utilize pneumatic actuation of a joint between two links. Particularly, the assembly 600 includes a joint housing or body 610 for housing the pneumatic joint actuator along with a first link or structural component 630 and a second link 620 or structural component 620.

As shown, the joint housing 610 is supported upon the first link 630, which may be a plate or have one or more arms/Linear linkages extending outward (into the page and not shown in FIG. 6). The second link 620 is pivotally mounted to the first link 630 via coupling or bearing 632, and, as shown, the link 620 has a body 622 (e.g., a linear member with a circular cross sectional shape or the like) extending from a first end 626 affixed to the pivotal mounting member or coupling 632 to a second end 624. When the pivotal member 632 (which may be considered an end of the link 620) rotates the body 622 rotates as shown with arrow 648 about the rotation axis (which may coincide with the linear axis of the body 622).

Further, the housing 610 includes a sidewall 612 that defines an inner space or void 618 in which the pivotal mounting member or coupling 632 may be housed. Further, the housing 610 includes a pair of encasement walls or barriers 614, 616 spaced apart from each other and extending from the sidewall 612 toward the center of the void/space 618 so as to define a separate encasement or receiving space 619 for a pair of opposing gas bladders 640, 644. The bladders 640, 644 may be selective inflated or pressurized via a pair of control gas flow lines or conduits (not shown in FIG. 6) but located beneath or on an opposite side of the first link 630.

The assembly 600 further includes an actuating lever arm 634 attached at a first end 636 to the pivotal mounting member or coupling 632 and left unattached at a second end 637 (which is also spaced apart from the sidewall 612 to allow free movement of the lever arm 634). The lever arm 634 extends between the two gas bladders 640, 644. Actuation, as discussed above, is achieved by independently and selectively supplying a control gas flow to the bladders 640, 644 so that bladders 640, 644 inflate to fill the void 619 or at least contact the encasement walls or barriers 614, 616 and opposite side of the lever arm 634.

The bladder 640 or 644 that is inflated to a greater volume (has a greater gas pressure) will apply a greater actuation force upon the lever arm 634 causing the lever arm 634 to move 646 a distance toward the other bladder 640 or 644, thereby compressing this compliant component. The encasement wall spacing can be used to define or limit the magnitude of the angular rotation of the link 620 such as clockwise or counterclockwise rotation 648 through a range of plus or minus 60 degrees (or a rotation angle of 120 degrees), with a rotation angle or angular movement range of about 60 degrees (or plus or minus 30 degrees being shown in FIG. 6.

The movement 646 of the lever arm 634 is translated to the pivotal mounting member or coupling 632, which causes it to rotate about its center axis and move relative to the first link 630. Concurrently, rotation of the coupling 632 causes the rigidly affixed or connected second link 620 to rotate 643 about the rotation axis (or longitudinal axis of the elongated body 622 of the link 620). To implement the assembly 600, a cover or retaining plate (not shown) may be positioned over the space or void of the joint housing 618 to encapsulate and retain the coupling 632 and bladders 640, 644 (again, defining the encasing space for the bladders 640, 644 along with barriers 614, 616 thus causing the bladders to expand toward each other so as to apply actuation forces onto opposite sides of the lever arm 634). The link body 622 would extend through this housing cover or retaining plate.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the above description discusses playing back stored motion profiles such that a controller may provide control signals to apply differing pressures to the opposing bladders to cause desired joint movements over time. In other cases, though, the pressurizing of the two opposing bladders may be performed based on live input from a human performer (e.g., a controller may process input from a performer to generate control signals to achieve joint movement).

In one prototype of a skeletal joint, each bladder was pressurized to substantially equal pressures such as a pressure in the range of 1 to 15 psi (e.g., P1=P2, which may be in this starting pressure range such as by setting the start pressures at 8 to 12 psi or the like with one test using 10 psi). Then, to get movement of the joint, one of the bladders had its pressure varied to cause movement (plus or minus some predefined amount), with one test applying a pressure that was either 5 psi greater or 5 psi less than the other bladder to apply opposing forces that caused useful movement of the joint.

We claim:

1. A robotic joint assembly, comprising:
   a first skeletal link with a body extending from a first end to a second end;
   a joint, mounted to the second end of the first skeletal link, comprising a joint housing with sidewalls defining an interior space and further comprising a pivotal mounting element supported in the joint housing;
   a second skeletal link with a body extending from a first end to a second end, wherein the first end of the body is pivotally coupled to the pivotal mounting element of the joint housing; and
   a pneumatic joint actuator comprising first and second gas bladders positioned within the interior space of the joint housing, wherein the second skeletal link is pivoted with inflation of at least one of the first and second gas bladders,
   wherein the first skeletal link comprises a first flow conduit extending through the body of the first skeletal link that is coupled at one end to an inlet to the first gas bladder and wherein the first skeletal link further comprises a second flow conduit extending through the body of the first skeletal link that is coupled at one end to an inlet to the second gas bladder.

2. The assembly of claim 1, further comprising an actuating lever arm extending outward from the first end of the body of the second skeletal link into the interior space to be disposed between the first and second gas bladders, wherein movement of the actuating lever arm urges the first end of the body of the second skeletal link to pivot about the pivotal mounting element.

3. The assembly of claim 2, wherein the selective inflation of the first gas bladder causes the first gas bladder to apply a first actuation force on a first side of the actuating lever arm and inflation of the second gas bladder causes the second gas bladder to apply a second actuation force on a second side opposite the first side, whereby the first and second actuation forces are opposing forces.

4. The assembly of claim 2, wherein the joint housing comprises encasement barriers in the interior space defining, with the sidewalls of the housing, first and second encasements in which the first and second gas bladders are placed and wherein the actuating lever arm extends between first and second encasements.

5. The assembly of claim 1, wherein the first and second gas bladders comprise an inflatable bag formed from a flexible and compliant material.

6. The assembly of claim 1, further comprising a first control gas supply fluidically linked to the first flow conduit and a second control gas supply fluidically linked to the second flow conduit, wherein the first and second control gas supplies are independently operable to provide a pressurized gas to the first and second flow conduits to perform the selective inflation of the first and second gas bladders.

7. The assembly of claim 6, further comprising a joint controller providing control signals to the first and second control gas supplies to perform the selective inflation to move the second skeletal link through a predefined motion profile.

8. The assembly of claim 7, further comprising first and second pressure sensors sensing pressures in the first and second flow conduits and, in response, providing pressure feedback signals to the joint controller, wherein the joint controller processes the pressure feedback signals and generates the control signals based on the pressure feedback signal processing and wherein the pressures are maintained, by the joint controller, below a predefined maximum, whereby the first and second gas bladders are compressible in response to an external force being applied to the first or second skeletal link.

9. A robotic joint assembly, comprising:
   a first skeletal link with a body extending from a first end to a second end;
   a joint, mounted to the second end of the first skeletal link, comprising a joint housing with sidewalls defining an interior space and further comprising a pivotal mounting element supported in the joint housing;
   a second skeletal link with a body extending from a first end to a second end, wherein the first end of the body is pivotally coupled to the pivotal mounting element of the joint housing;
   a pneumatic joint actuator comprising first and second gas bladders positioned within the interior space of the joint housing, wherein the second skeletal link is pivoted with inflation of at least one of the first and second gas bladders;

an additional joint housing pivotally attached to the second end of the body of the second skeletal link;

a third gas bladder filled with a fixed volume of a gas, wherein the third gas bladder extends through or on the body of the second skeletal link with a first end positioned in the interior space of the joint housing and abutting one or more exterior surfaces of the first end of the second skeletal link and with a second end positioned in an interior space of the additional joint housing; and an additional actuating lever arm extending outward from the second end of the second skeletal link into the interior space of the additional joint housing, wherein the first end of the third gas bladder is compressed during pivoting of the second skeletal link on the pivotal mounting element and, in response, the second end of the third gas bladder is expanded causing the second end of the third gas bladder to apply an additional actuating force, whereby the additional joint housing pivots on the second end of the body of the second skeletal link.

10. The assembly of claim 1, wherein the second skeletal link is pivoted about a longitudinal axis of the body of the second skeletal link with the inflation of at least one of the first and second gas bladders.

11. A robot with expressive and compliant movement, comprising:

first and second structural elements;

a joint joining a portion of the first structural element to a portion of the second structural element, wherein the second structural element is pivotal about the portion of the first structural element; and a pneumatic actuator comprising a first gas bladder and a second gas bladder positioned in the joint, wherein the second structural element pivots in a first direction when the first gas bladder is inflated to a pressure greater than a pressure in the second gas bladder and wherein the second structural element pivots in a second direction opposite the first direction when the second gas bladder is inflated to a pressure greater than a pressure in the first gas bladder;

a first flow channel in the first structural element with an outlet coupled to an inlet of the first gas bladder; and a second flow channel in the first structural element with an outlet coupled to an inlet of the second gas bladder, whereby control gas may selectively be directed to flow through the first structural element to one or both of the first and second gas bladders to actuate the joint.

12. The robot of claim 11, wherein a lever arm extends from an end of the second structural element to be disposed between the first and second gas bladders, whereby the first and second gas bladders apply opposing actuation forces on opposite sides of the lever arm.

13. The robot of claim 11, further comprising first and second gas supplies independently operable to provide the control gas to the first and second gas bladders, respectively, and wherein the robot further includes a joint controller controlling operation of the first and second gas supplies to a rotate or move the second structural by pressurizing the first and second gas bladders to first and second pressures.

14. The robot of claim 11, wherein the first and second gas bladders are formed of flexible material selected from the group consisting of rubber, plastic, and fabric, wherein the joint includes first and second adjacent interior spaces with matching volumes for receiving the first and second bladders, respectively, and wherein each of the interior space includes an opening through which the first and second bladders may extend through contact an actuating arm of the second structural element.

15. A robotic system, comprising:

a first link with a body comprising a first flow channel and a second flow channel;

a first flexible gas bladder coupled to an outlet of the first flow channel;

a second flexible gas bladder coupled to an outlet of the second flow channel;

a second link pivotally mounted to the first link;

a lever arm connected to the second link such that movement of the lever arm causes the second link to pivot relative to the first link, wherein at least a portion of the lever arm is sandwiched between the first and second flexible gas bladders;

a first gas supply operable to provide pressurized gas to an inlet of the first flow channel; and a second gas supply operable to provide pressurized gas to an inlet of the second flow channel, wherein at least one relief valve is provided to release the pressurized gas from at least one of the first and second flexible gas bladders when an external force is applied to the first link or the second link.

16. The system of claim 15, further comprising:

a controller selectively operating the first and second gas supplies to inflate the first and second flexible gas bladders to differing pressures to pivot the second link about a pivot axis extending through a pivotal mounting element or about a longitudinal axis of the second link.

17. The system of claim 15, wherein the first and second encased and adjacent spaces with matching volumes are provided in a housing on the body of the first link, wherein the first and second flexible gas bladders are positioned in the first and second encased and adjacent spaces, respectively, and wherein the lever arm extends between the first and second encased and adjacent spaces.

18. A robotic system, comprising:

a first link with a body comprising a first flow channel and a second flow channel;

a first flexible gas bladder coupled to an outlet of the first flow channel;

a second flexible gas bladder coupled to an outlet of the second flow channel;

a second link pivotally mounted to the first link;

a lever arm connected to the second link such that movement of the lever arm causes the second link to pivot relative to the first link, wherein at least a portion of the lever arm is sandwiched between the first and second flexible gas bladders; and a third flexible gas bladder filled with a fixed volume of gas and a third link pivotally coupled to the second link, wherein the third flexible gas bladder is positioned in contact with the lever arm or the second link, wherein a portion of the third flexible gas bladder is compressed by the lever arm or second link upon movement of the lever arm to pivot the second link, and wherein, in response to the compression of the portion of the third flexible gas bladder, another portion of the third flexible gas bladder expands to apply an actuation force to pivot the third link relative to the second link.

* * * * *